(12) United States Patent
Morikawa

(10) Patent No.: US 12,689,229 B2
(45) Date of Patent: Jul. 21, 2026

(54) BATTERY CHARGING CONTROL DEVICE

(71) Applicant: ISUZU MOTORS LIMITED, Tokyo (JP)

(72) Inventor: Kenji Morikawa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 819 days.

(21) Appl. No.: 18/022,100

(22) PCT Filed: Aug. 27, 2021

(86) PCT No.: PCT/JP2021/031470
§ 371 (c)(1),
(2) Date: Feb. 17, 2023

(87) PCT Pub. No.: WO2022/045284
PCT Pub. Date: Mar. 3, 2022

(65) Prior Publication Data
US 2023/0327474 A1       Oct. 12, 2023

(30) Foreign Application Priority Data
Aug. 31, 2020     (JP) ................................. 2020-145419

(51) Int. Cl.
*H01M 10/46*          (2006.01)
*H01M 10/617*         (2014.01)
           (Continued)
(52) U.S. Cl.
CPC ........... *H02J 7/975* (2026.01); *H01M 10/617* (2015.04); *H01M 10/625* (2015.04);
           (Continued)

(58) Field of Classification Search
CPC ........... H02J 2310/48; H02J 7/007192; H01M 10/48; H01M 10/443; H01M 10/635; H01M 10/6331; B60L 58/26; B60L 2240/545
           (Continued)

(56) References Cited
U.S. PATENT DOCUMENTS 9,556,812 B2 * 1/2017 Ozkan .................. G01N 33/004
2016/0031334 A1 2/2016 Marchal et al.
           (Continued)

FOREIGN PATENT DOCUMENTS

JP        2005-117727 A        4/2005
JP        2007-080727 A        3/2007
           (Continued)

OTHER PUBLICATIONS

Machine translate of JP2007080727A (Mar. 29, 2007) (Year: 2007).*
Machine translate of JP2011259672A (Dec. 22, 2011) (Year: 2011).*

*Primary Examiner* — Edward Tso
(74) *Attorney, Agent, or Firm* — PROCOPIO, CORY, HARGREAVES & SAVITCH LLP

(57)           ABSTRACT
A charge controller including: an environment prediction part that predicts, during charging of a battery mounted on a vehicle, a state of an external environment of the vehicle after an end of charging; a target temperature setting part that sets a target temperature of the battery at the end of charging on the basis of the state of the external environment predicted by the environment prediction part; and temperature adjusting part that adjusts a temperature of the battery during the charge such that the temperature of the battery becomes the target temperature set by the target temperature setting part at the end of charging.

7 Claims, 3 Drawing Sheets

(51) Int. Cl.

| | |
|---|---|
| *H01M 10/625* | (2014.01) |
| *H01M 10/635* | (2014.01) |
| *H01M 10/657* | (2014.01) |
| *H02J 7/90* | (2026.01) |
| *B60L 58/26* | (2019.01) |
| *B60L 58/27* | (2019.01) |

(52) U.S. Cl.
CPC ....... *H01M 10/635* (2015.04); *H01M 10/657* (2015.04); *B60L 58/26* (2019.02); *B60L 58/27* (2019.02); *B60L 2240/545* (2013.01); *H01M 2220/20* (2013.01)

(58) Field of Classification Search
USPC ................ 320/104, 107, 132, 149, 150, 153
See application file for complete search history.

(56) References Cited

U.S. PATENT DOCUMENTS

| | | | |
|---|---|---|---|
| 2016/0214495 A1 | 7/2016 | Murata et al. | |
| 2020/0141174 A1* | 5/2020 | Herman ................ | B60L 53/305 |
| 2023/0234467 A1* | 7/2023 | Shigyo ................... | B60L 53/66 |
| | | | 320/106 |

FOREIGN PATENT DOCUMENTS

| | | | |
|---|---|---|---|
| JP | 2011-259672 A | 12/2011 | |
| JP | 2015-043662 A | 3/2015 | |
| JP | 2016-513342 A | 5/2016 | |

* cited by examiner

1

| 2 | | 10 |
| --- | --- | --- |
| BATTERY | | CHARGE CONTROLLER |

4

GENERATOR

CHARGE CONTROLLER ~10

CONTROL PART ~14

ENVIRONMENT PREDICTION PART ~142

TARGET TEMPERATURE SETTING PART ~143

TEMPERATURE DETECTION PART ~144

TEMPERATURE ADJUSTING PART ~145

BATTERY ~2

EXTERNAL SERVER ~8

COMMUNICA-TION PART ~13

STORAGE ~12

BATTERY CHARGING CONTROL DEVICE

CROSS-REFERENCE TO RELATED APPLICATIONS

The present application is a U.S. National Stage entry of PCT Application number PCT/JP2021/031470, filed on Aug. 27, 2021, which claims priority under 35 U.S.C § 119 (a) to Japanese Patent Application No. 2020-145419, filed on Aug. 31, 2020, contents of which are incorporated herein by reference in their entirety.

TECHNICAL FIELD

The present invention relates to a charge controller.

BACKGROUND OF THE INVENTION

A vehicle is equipped with a charge controller that controls charging of a battery. Patent Document 1 discloses a technique of charging a battery while adjusting a battery temperature. Specifically, charging of the battery is controlled such that the battery is at temperatures at which the battery discharges easily.

PRIOR ART

Patent Document

Patent Document 1: Japanese Unexamined Patent Application Publication No. 2005-117727

BRIEF DESCRIPTION OF THE INVENTION

Problem to be Solved by the Invention

When the battery is left unattended after charging, the battery temperature may change due to the influence of an external environment, which may adversely affect the battery. For example, the battery deteriorates when the battery temperature becomes high, and an abnormality may occur when the battery is used at low temperatures. The above-described technique of Patent Document 1 cannot adjust the temperature of the battery after charging.

The present invention focuses on this point, and its object is to prevent or reduce adverse effects on a battery after charging.

Means for Solving the Problem

A first aspect of the present invention provides a charge controller including: an environment prediction part that predicts, during charging of a battery mounted on a vehicle, a state of an external environment of the vehicle after an end of charging; a target temperature setting part that sets a target temperature of the battery at the end of charging on the basis of the state of the external environment predicted by the environment prediction part; and a temperature adjusting part that adjusts a temperature of the battery during the charge such that the temperature of the battery becomes the target temperature, set by the target temperature setting part, at the end of charging.

The environment prediction part may predict a change in an outside air temperature after the end of charging as the state of the external environment, and the target temperature setting part may set the target temperature on the basis of the change in the outside air temperature.

The environment prediction part may predict a magnitude of the change in the outside air temperature after the end of charging, and the target temperature setting part may set the target temperature within a predetermined temperature zone according to the magnitude of the change in the outside air temperature.

The target temperature setting part may set the target temperature lower than a predetermined value when the environment prediction part predicts that the temperature of the battery will rise after the end of charging, and set the target temperature higher than the predetermined value when the environment prediction part predicts that the temperature of the battery will decrease after the end of charging.

The target temperature setting part may set the target temperature to a temperature at a lower limit in a predetermined temperature zone when the environment prediction part predicts that the temperature of the battery will rise after the end of charging, and set the target temperature to a temperature at an upper limit in the temperature zone when the environment prediction part predicts that the temperature of the battery will decrease after the end of charging.

The charge controller may further includes a storage that stores environment information indicating a state of past external environment, and the environment prediction part may predict a state of an external environment after an end of charging on the basis of the environment information stored in the storage.

Effect of the Invention

According to the present invention, it is possible to prevent or reduce adverse effects on a battery after charging.

DETAILED DESCRIPTION OF THE INVENTION

<Configuration of a Charge Controller>

A charge controller is mounted on a vehicle, for example, and controls charging of a battery provided in the vehicle.

Figures 1, 2:
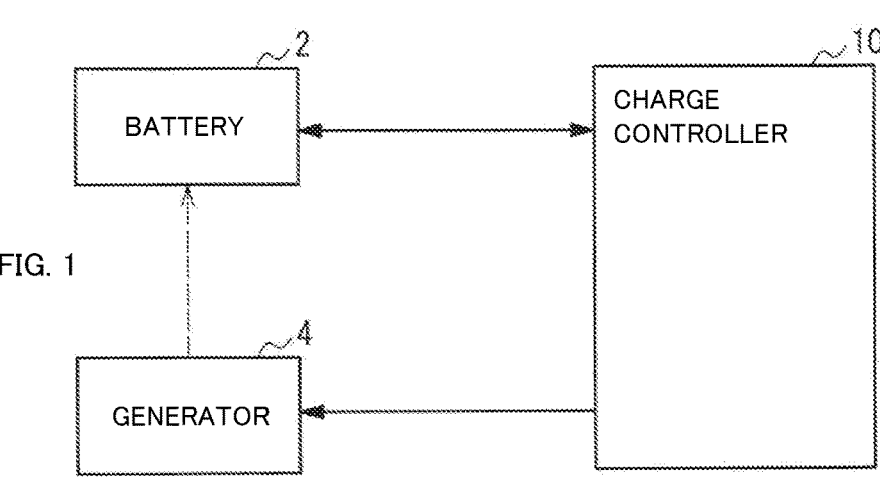
FIG. 1 is a schematic diagram illustrating an example of a configuration of a vehicle 1 equipped with a charge controller.
FIG. 2 is a block diagram illustrating an example of a configuration of a charge controller 10.

FIG. 1 is a schematic diagram illustrating an example of a configuration of a vehicle 1 equipped with the charge controller. The vehicle 1 is an electric vehicle (EV), for example. As shown in FIG. 1, the vehicle 1 includes a battery 2, a generator 4, and a charge controller 10. In FIG. 1, as a matter of convenience, other components of the vehicle 1 are omitted.

The battery 2 is an EV battery. The temperature of the battery 2 is not constant and may change after the end of charging. For example, the temperature of the battery 2 rises when the external temperature of the vehicle 1 rises, and decreases when the external temperature decreases.

The generator 4 is a motor electrically connected to the battery 2 and supplies electric power to the battery 2, for example. The battery 2 is charged by the supply current flowing from the generator 4 to the battery 2.

The charge controller 10 controls charging of the battery 2. The charge controller 10 controls charging of the battery 2 by controlling the supply current flowing from the generator 4 to the battery 2, for example. Although details will be described later, the charge controller 10 of the present embodiment adjusts the temperature of the battery 2 during the charge such that the temperature of the battery 2 at the end of charging becomes a target temperature set on the basis of a state of the external environment predicted during charging. By doing this, the temperature of the battery 2 at the end of charging reflects the state of the external environment, and therefore it is possible to prevent the battery 2 from being adversely affected by the external environment after the end of charging.

In the above description, the battery 2 is charged by receiving a power supply from the generator 4, but the present invention is not limited to this. For example, the battery 2 may be charged by receiving power from a charger outside the vehicle 1. Even in this case, the charge controller 10 controls charging of the battery 2 by controlling the current from the charger.

[Detailed Configuration of the Charge Controller 10]

A detailed configuration of the charge controller 10 will be described with reference to FIG. 2.

FIG. 2 is a block diagram illustrating an example of a configuration of the charge controller 10. As shown in FIG. 2, the charge controller 10 includes a storage 12, a communication part 13, and a control part 14.

The storage 12 includes a read only memory (ROM) and a random access memory (RAM), for example. The storage 12 stores various types of data and programs to be executed by the control part 14. For example, the storage 12 stores environment information indicating a state of past external environment.

The communication part 13 communicates with a device provided outside the vehicle 1. The communication part 13 transmits and receives information to and from an external server 8. For example, the communication part 13 receives real-time weather information from the external server 8. The weather information is information on temperature, sunshine duration, weather, and the like, for example. The weather information received from the external server 8 may be stored in the storage 12.

The control part 14 is a central processing unit CPU), for example. The control part 14 performs a process of charging the battery 2 by executing the program stored in the storage 12. In the present embodiment, the control part 14 functions as an environment prediction part 142, a target temperature setting part 143, a temperature detection part 144, and a temperature adjusting part 145.

The environment prediction part 142 predicts a state of the external environment of the vehicle 1. The environment prediction part 142 predicts, during charging of the battery 2, a state of the external environment after the end of charging. For example, the environment prediction part predicts a state of the external environment for a predetermined time (e.g., 8 hours to 24 hours) from the end of charging. The environment prediction part 142 predicts, as the state of the external environment, a change in an outside air temperature after the end of charging of the battery 2. For example, the environment prediction part 142 predicts whether the outside air temperature will rise or decrease after the end of charging of the battery 2. The environment prediction part 142 may predict the degree of change in the outside air temperature within a predetermined time period from the end of charging.

The environment prediction part 142 may predict a state of the external environment by acquiring the weather information from the external server 8 in real time. That is, the environment prediction part 142 may predict the state of the external environment based on the weather information which the communication part 13 received from the external server 8 in real time. By acquiring the weather information in real time, the state of the external environment after the end of charging can be accurately predicted.

The environment prediction part 142 may predict a state of the external environment after the end of charging, on the basis of the environment information indicating the state of past external environment stored in the storage 12. By doing this, when the weather information cannot be acquired from the external server 8, the state of the external environment after the end of charging can be estimated by referencing the environment information of the same time of day in the past.

The target temperature setting part 143 sets a target temperature of the battery 2 at the end of charging. The target temperature setting part 143 sets the target temperature of the battery 2 in consideration of a state of the external environment when the battery 2 is left unattended after the end of charging. Here, the target temperature setting part 143 sets the target temperature of the battery 2 at the end of charging on the basis of the state of the external environment that has been predicted by the environment prediction part 142.

Figure 3:
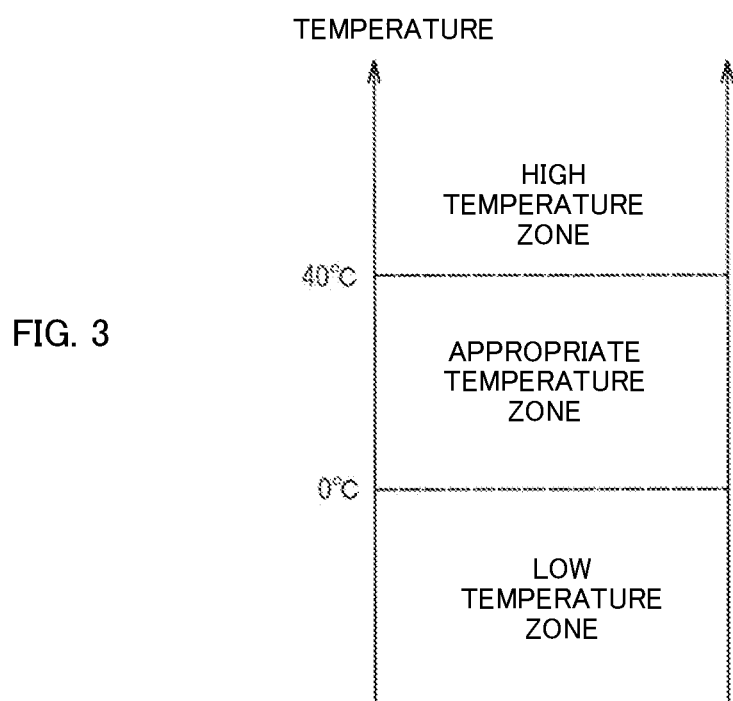
FIG. 3 is a schematic diagram for illustrating an example of setting a target temperature of a battery 2.

FIG. 3 is a schematic diagram for illustrating an example of setting the target temperature of the battery 2. Here, a temperature zone of the battery 2 is divided into an appropriate temperature zone, a high temperature zone, and a low temperature zone. The appropriate temperature zone is temperature in the range of 0° C. to 40° C., for example. The high temperature zone is a temperature zone higher than 40° C. and the low temperature zone is a temperature zone lower than 0° C. In the appropriate temperature zone, the battery 2 is less likely to deteriorate and functions normally. In the high temperature zone, the battery 2 tends to deteriorate due to high temperature. In the low temperature zone, precipitation tends to occur when the battery 2 is charged. Therefore, the target temperature setting part 143 sets the temperature in the appropriate temperature zone (0° C. to 40° C.) of the battery 2 as the target temperature.

The target temperature setting part 143 sets the target temperature on the basis of a change in an outside air temperature after the end of charging of the battery 2. This enables setting of a target temperature under the assumption that the battery 2 after the end of charging will be affected by the outside air temperature. In other words, the target temperature setting part 143 can set, as the target temperature, a temperature in the above-described appropriate temperature zone that can reduce the influence of the outside air temperature.

When the environment prediction part 142 predicts that the temperature of the battery 2 will rise after the end of charging, the target temperature setting part 143 sets the target temperature lower than a predetermined value. For example, the target temperature setting part 143 sets a temperature at the lower limit (close to 0° C.) in the above-described appropriate temperature zone as the target temperature. On the other hand, when the environment prediction part 142 predicts that the temperature of the battery 2 will decrease after the end of charging, the target temperature setting part 143 sets the target temperature higher than the predetermined value. For example, the target temperature setting part 143 sets a temperature at the upper limit (close to 40° C.) in the appropriate temperature zone as the target temperature. This facilitates maintaining the temperature of the battery 2 in the appropriate temperature zone even when the outside air temperature rises or decreases after the end of charging. The predetermined value is a median value (20° C.) of the appropriate temperature zone, for example.

The target temperature setting part 143 may set the target temperature within a predetermined temperature zone according to the magnitude of the change in the outside air temperature. For example, the target temperature setting part 143 sets 0° C., which is in the appropriate temperature zone, as the target temperature when it is predicted that the outside air temperature will increase significantly, and sets 15° C., which is in the appropriate temperature zone, to the target temperature when it is predicted that the outside air temperature will increase slightly.

The temperature detection part 144 detects the temperature of the battery 2. The temperature detection part 144 detects, during charging of the battery 2, the temperature of the battery 2. The temperature detection part 144 includes a temperature sensor capable of detecting the temperature of the battery 2.

The temperature adjusting part 145 adjusts the temperature of the battery 2 during the charge. Specifically, the temperature adjusting part 145 adjusts the temperature of the battery 2 by performing heating or cooling during charging of the battery 2. Methods of heating the battery 2 include heating by charging itself and heating by a heater, for example. Methods of cooling the battery 2 include cooling by a fan or a compressor. The temperature adjusting part 145 adjusts the temperature of the battery 2 during the charge such that the temperature of the battery 2 becomes the target temperature, set by the target temperature setting part 143, at the end of charging. That is, the temperature adjusting part 145 heats or cools the battery 2 such that the temperature of the battery 2 detected by the temperature detection part 144 at the end of charging becomes the target temperature. By doing this, the temperature of the battery 2 can be prevented from deviating from the appropriate temperature zone even if the battery 2 is left unattended after the end of charging. As a result, it is possible to prevent or protect the battery 2 from being adversely affected (deterioration or precipitation) due to the temperature of the battery 2 deviating from the appropriate temperature zone after the end of charging.

\<Charging Process for a Battery\>

A charging process for the battery 2 will be described with reference to FIG. 4.

Figure 4:
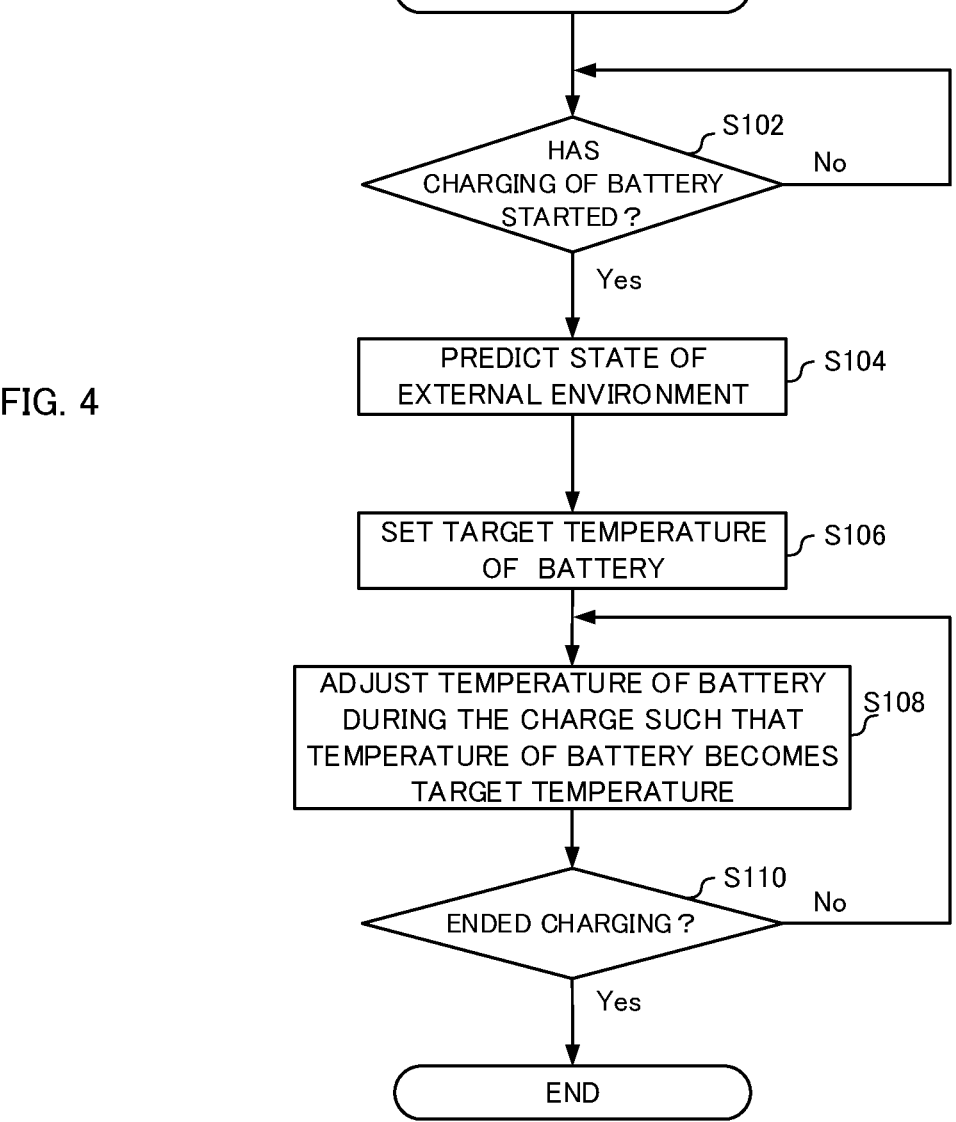
FIG. 4 is a flowchart showing an example of a charging process for the battery 2.

FIG. 4 is a flowchart showing an example of a charging process for the battery 2. First, the charge controller 10 determines whether or not to start charging of the battery 2 (step S102).

When it is determined in step S102 that the charging of the battery 2 is to be started (Yes), the environment prediction part 142 predicts a state of the external environment of the vehicle 1 after the end of charging (step S104). For example, the environment prediction part 142 predicts a change in an outside air temperature for a predetermined time from the end of charging.

Next, the target temperature setting part 143 sets a target temperature of the battery 2 at the time of the end of charging on the basis of the predicted state of the external environment (step S106). For example, the target temperature setting part 143 sets the target temperature on the basis of a change in the outside air temperature after the end of charging.

Next, the temperature adjusting part 145 adjusts the temperature of the battery 2 during the charge such that the temperature of the battery 2 becomes the target temperature (step S108). For example, the temperature adjusting part 145 heats or cools the battery 2 such that the temperature of the battery 2 becomes the target temperature.

The temperature adjusting part 145 performs the process of step S108 until charging ends (step S110: Yes). Therefore, at the end of charging, the temperature of the battery 2 becomes the target temperature.

Effects of the Present Embodiment

The charge controller 10 of the above-described embodiment predicts, during charging of the battery 2, a state of the external environment after the end of charging, and sets a target temperature at the end of charging on the basis of the predicted state of the external environment. The charge controller 10 adjusts the temperature of the battery 2 during the charge such that the temperature of the battery 2 becomes the target temperature at the end of charging. By doing this, a temperature of the battery 2 at the end of charging reflects the predicted state of the external environment. For example, when it is predicted that the outside air temperature will rise after the end of charging, the temperature of the battery 2 at the end of charging decreases, and when it is predicted that the outside air temperature will decrease after the end of charging, the temperature at the end of charging of the battery 2 increases. Therefore, even if the battery 2 is left unattended after the end of charging and the temperature of the battery 2 changes due to the outside air temperature, temperatures in the appropriate temperature zone can be easily maintained, and adverse effects on the battery 2 can be prevented or reduced.

The present disclosure is explained on the basis of the exemplary embodiments. The technical scope of the present disclosure is not limited to the scope explained in the above embodiments and it is possible to make various changes and modifications within the scope of the disclosure. For example, all or part the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

DESCRIPTION OF SYMBOLS

1 Vehicle
2 Battery
10 Charge controller
12 Storage
142 Environment prediction part
143 Target temperature setting part
145 Temperature adjusting part

The invention claimed is:
1. A charge controller comprising:
an environment prediction part that predicts, during charging of a battery mounted on a vehicle, a state of an external environment of the vehicle after an end of charging;

a target temperature setting part that sets a target temperature of the battery at the end of charging on a basis of the state of the external environment predicted by the environment prediction part;

a temperature adjusting part that adjusts a temperature of the battery during the charge such that the temperature of the battery becomes the target temperature, set by the target temperature setting part, at the end of charging, and a storage that stores environment information indicating a state of past external environment, wherein the environment prediction part predicts a state of an external environment after an end of charging on a basis of the environment information stored in the storage.

2. The charge controller according to claim 1, wherein the environment prediction part predicts a change in an outside air temperature after the end of charging as the state of the external environment, and the target temperature setting part sets the target temperature on the basis of the change in the outside air temperature.

3. The charge controller according to claim 2, wherein the environment prediction part predicts a magnitude of the change in the outside air temperature after the end of charging, and the target temperature setting part sets the target temperature within a predetermined temperature zone according to the magnitude of the change in the outside air temperature.

4. The charge controller according to claim 2, wherein the target temperature setting part sets the target temperature lower than a predetermined value when the environment prediction part predicts that the temperature of the battery will rise after the end of charging, and sets the target temperature higher than the predetermined value when the environment prediction part predicts that the temperature of the battery will decrease after the end of charging.

5. The charge controller according to claim 4, wherein the target temperature setting part sets the target temperature to a temperature at a lower limit in a predetermined temperature zone when the environment prediction part predicts that the temperature of the battery will rise after the end of charging, and sets the target temperature to a temperature at an upper limit in the temperature zone when the environment prediction part predicts that the temperature of the battery will decrease after the end of charging.

6. The charge controller according to claim 1, wherein the temperature adjusting part adjusts the temperature of the battery during the charge by performing heating and cooling of the battery during charging of the battery.

7. The charge controller according to claim 1, further comprising a temperature detection part that detects the temperature of the battery during the charge, wherein the temperature adjusting part adjusts the temperature of the battery during the charge such that the temperature detected by the temperature detection part at the end of charging becomes the target temperature.

* * * * *